March 12, 1968     B. KARLOVITZ     3,373,306
METHOD AND APPARATUS FOR THE CONTROL OF IONIZATION
IN A DISTRIBUTED ELECTRICAL DISCHARGE Filed Oct. 27, 1964     3 Sheets-Sheet 1

INVENTOR.
Bela Karlovitz
BY
Webb Burden Robinson & Webb
HIS ATTORNEYS

INVENTOR.
Bela Karlovitz

United States Patent Office 3,373,306
Patented Mar. 12, 1968

3,373,306
METHOD AND APPARATUS FOR THE CONTROL OF IONIZATION IN A DISTRIBUTED ELECTRICAL DISCHARGE
Bela Karlovitz, Pittsburgh, Pa., assignor to Northern Natural Gas Company, Omaha, Nebr., a corporation of Delaware
Filed Oct. 27, 1964, Ser. No. 406,810
12 Claims. (Cl. 313—231)

In United States Patent No. 3,004,137, I describe and claim an electrically augmented flame in which an electrical discharge is distributed throughout a flame created by chemical combustion and thereby heat derived from the electrical energy is added to the heat produced by the chemical combustion. The electrical discharge employs a high voltage and a low current as contrasted to an electric arc which employs a low voltage and a high current and which is concentrated into a narrow filament between two electrodes.

Such an electrically augmented flame produces useful results. For example, electrical power supply problems are reduced because large amounts of power can be supplied at conveniently high voltages. Since relatively low currents are employed, construction and maintenance of electrodes are greatly simplified; further, substantially uniform temperature is maintained throughout the entire flame. Most important, temperatures can be obtained with ordinary fuels which otherwise could be obtained only with high cost fuels.

The term "distributed discharge" denotes a type of high power electrical discharge which is contrasted to the electric arc. The electric arc tends to contract into a narrow channel in which the gas temperature and consequently the electrical conductivity is very high.

In the "distributed discharge" concentration of the discharge current into a narrow channel is prevented by pre-ionization and application of strong turbulence. The discharge current is dispersed over the gaseous stream to be heated, resulting in a more or less uniform heating of the gas stream.

In the application of an electrical discharge to a chemical flame, it is desirable to pre-ionize the flame to increase or regulate the ion electron concentration within the flame thereby increasing or regulating the electrical conductivity of the flame. This is done to stabilize the volt ampere characteristic of the electrical discharge, and it may also be used to start electrical discharges through flames which are at relatively low temperatures. A method for pre-ionization disclosed in Patent No. 3,004,137 consists in the addition of salts or metals having low ionization potentials to the explosive mixture in advance of the flame. While the desired pre-ionization can be obtained in this manner, large quantities of additives may be required because the ion electron concentration in the flame increases only in proportion to the square root of the concentration of the ionizing additive and depends very strongly on the flame temperature.

I have found that more effective pre-ionization can be obtained if the ionizing additive is introduced into a high temperature piloting region or zone of the flame, and the ions and electrons which are formed there are dispersed from that region into the entire flame.

The piloting region or zone is a volume filled with high temperature gas formed either by recirculating eddies, or by burning a separate pilot region which continuously ignites the combustible stream and from which the flame spreads across the entire combustible stream. The piloting region can also be formed by an electric arc discharging between electrodes positioned within the region. The term, high temperature, when here used in reference to the temperature of the piloting region, means a temperature of 3000° K. or above.

Such a hot piloting zone can be created in various ways. Thus, I may maintain a pilot flame located at the root of the main flame and introduce ionizing additive into the pilot flame. Alternately, I may introduce ionizing additive into the piloting region by evaporation from an electrode in contact with the piloting zone. The electrode may be impregnated or have as a constituent a metal salt having a low ionization potential or the electrode may have a core formed of the metal salt. Alternatively, the electrode may be made of a metal having a low ionization potential, and the electrode be consumed during operation of the flame.

In the accompanying drawings, I have illustrated certain presently preferred embodiments of my invention in which.

Figure 1:
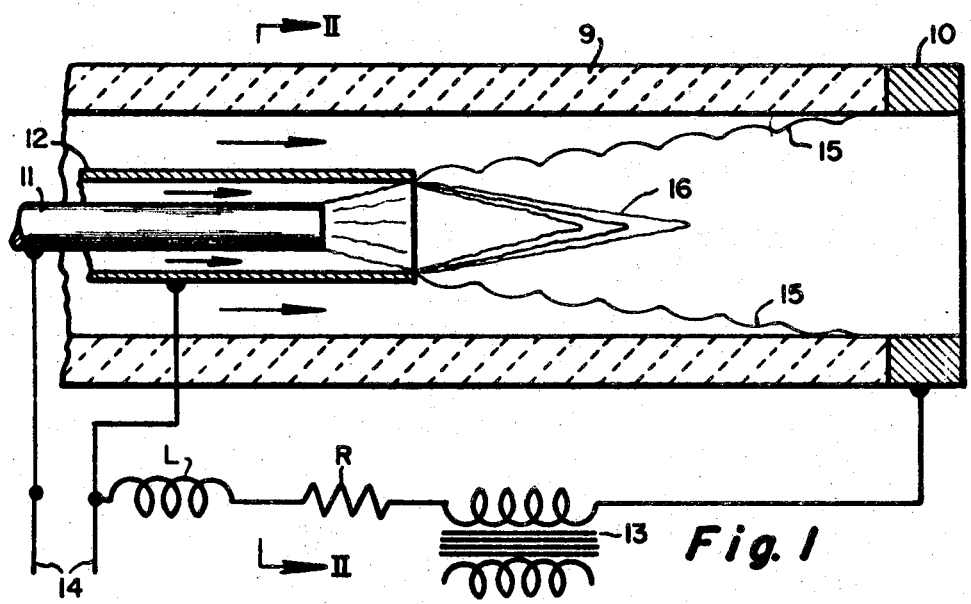
FIGURE 1 is a partial longitudinal section of a burner to which has been added an electrical diagram showing the connections for the electrical supply burner.
Figure 2:
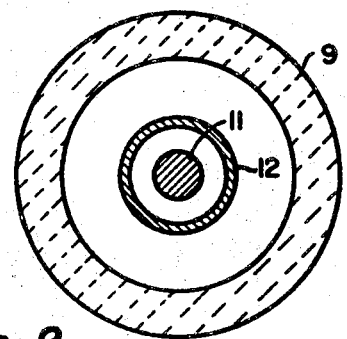
FIGURE 2 is a section along the lines II—II of FIGURE 1.

Referring to FIGURE 1, a burner embodying my invention includes a tube 9 of refractory material having a circular metal electrode 10 at its outer end and a second electrode 11 which is concentric with the tube 9 and is spaced within the tube away from the electrode 10 at the end of the tube. A second tube 12 is positioned within the tube 9 and is concentric with the central electrode 11 and the tube 9. The burner thus has two annular passages for the flow of an explosive mixture; the first being between the tubes 9 and 12, and the second being between the electrode 11 and the tube 12.

The electrical circuit includes a step-up transformer 13 supplied by a source of power (not shown), and this transformer is connected so as to impress a voltage between the electrodes 10 and 11. As explained in my Patent No. 3,004,137 (col. 3, line 60, to col. 4, line 11), I provide a series ballast including a resistance R and an inductance L to enable operation on the falling portion of the volt ampere characteristic of the discharge. A second source 14 of electric power is connected to the electrode 11 and the tube 12 to impress a voltage between them. Direct current can be used as well as alternating current as a source of electrical power.

In operation of the burner, a combustible mixture is supplied between the tubes 9 and 12 and a flame is ignited, the electrode 11 acting as a flame holder. A relatively high voltage is applied between electrodes 10 and 11. Ionizing additive is introduced into the hot piloting zone, as hereinafter described, and a substantial electrical discharge is distributed uniformly across the cone-shaped flame which extends between the electrodes 10 and 11 and is indicated by the line 15.

The portion of the flame between the electrode 11 and the tube 12 is used for the piloting zone into which ionizing additive is introduced and in which ionization is created. The ionization spreads from the piloting zone over the entire flame. The volume of the piloting zone between the electrode 11 and the tube 12 is small and, therefore, the current density in that region can be made quite high and the temperature will be high (in order of 3000 to 4000° K.).

Alternatively, the pilot region can be maintained at a high temperature by burning within the tube 12 at the end of the electrode 11 a hot chemical flame such as an oxyacetylene flame. The temperature can also be maintained by an electric arc or by recirculating a flame by means of a flame holder, which flame can be heated by an auxiliary electrical discharge from the source 14 or by current from the main electrical discharge between electrodes 10 and 11.

The ionizing additive can be supplied to the pilot region in a number of ways. For example, an ionizing additive, such as a metal salt, is vaporized in apparatus (not shown) and supplied to the passage between the electrode 11 and the tube 12 and is introduced into the piloting zone of the flame. Because a high temperature is maintained in this zone, a high ion electron concentration (in order of $10^{14}$ per cubic centimeter) is created.

The piloting zone and the heavy ion concentration will extend into the hot core of the flame which is indicated by the wavy lines 16 and spread from the core to supply the ion electron concentration desired for operation of the main flame. In the region downstream from this zone, the ion electron concentration may exceed the equilibrium concentration, but the recombination rate for atomic metal ions is sufficiently low that loss of ions and electrons by recombination will not be significant.

FIGURES 3 to 6 inclusive show alternate methods and apparatus for controlling the ion electron concentration within a flame. As in the case of the burner just described, the alternate embodiments produced a piloting region at the root of the flame in which region a heavy concentration of ionization is generated.

Figure 3:
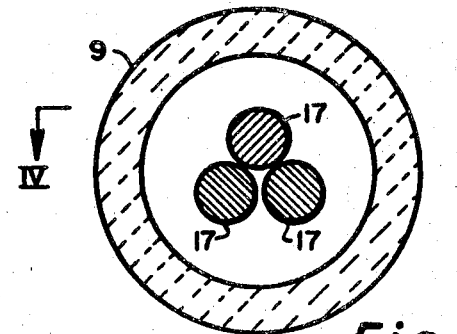
FIGURE 3 is a section along the lines III—III of FIGURE 4 showing a modified form of burner.
Figure 4:
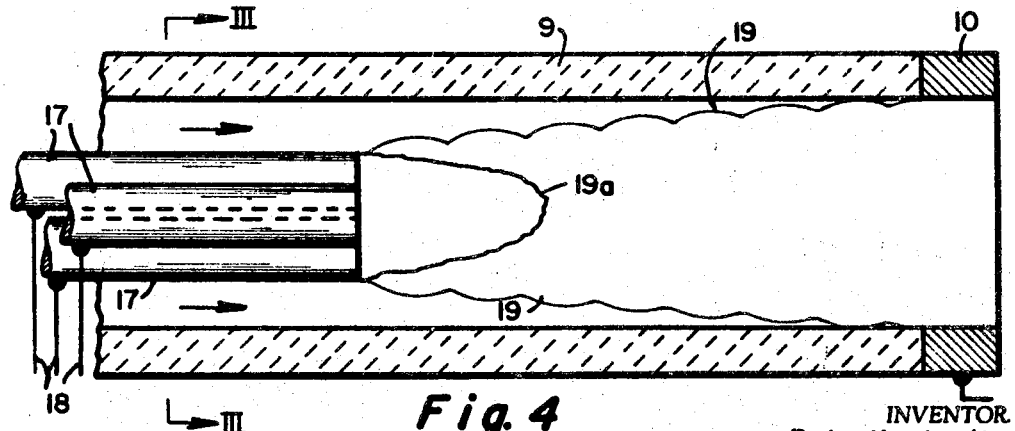
FIGURE 4 is a section along the lines IV—IV of FIGURE 3.

In the burner shown in FIGURES 3 and 4, three electrodes 17 extend along the axis of the tube 9 and are connected to a three-phase alternating current supply (not shown) through leads 18. The three electrodes act as the inner electrode 11 in the embodiment shown in FIGURE 1 and an explosive mixture is introduced into the tube 9, a flame indicated by the lines 19 is formed between the three electrodes and the outer electrode 10, the three electrodes acting as a flame holder. These electrodes may be coated with a metallic salt, they may be porous and have a metallic salt impregnated in them, or they may have cores. A continuous power input is maintained between the three electrodes and the ionizing additive is vaporized and supplied to the hot piloting zone indicated by the line 19a.

Figure 5:
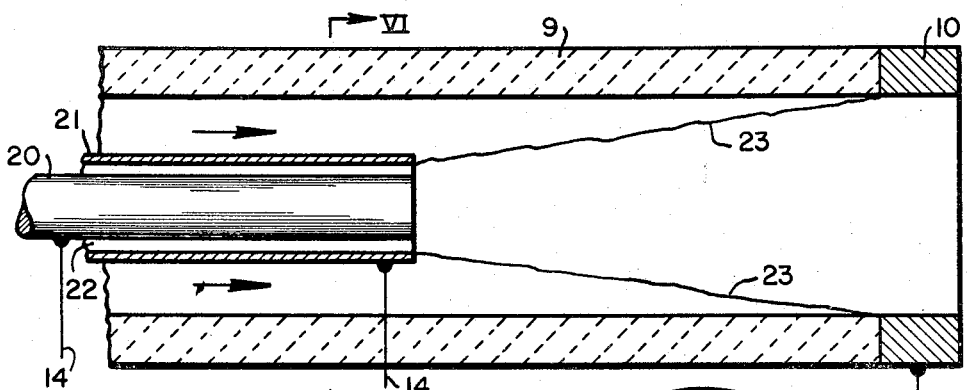
FIGURE 5 is a longitudinal section of another form of burner.
Figure 6:
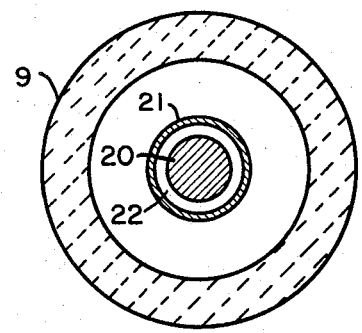
FIGURE 6 is a section along the lines VI—VI of FIGURE 5.

In the burner shown in FIGURES 5 and 6, there is a central electrode 20 which lies concentrically within the tube 9 and the electrode 20 is surrounded by a separate tube 21 having an internal diameter such that a small annular space 22 is formed between the electrode 20 and the tube 21. A flame, indicated by the lines 23, is formed between the electrode 20 and the tube 21, and a distributed electrical discharge is created within the flame in the same manner as has been described with reference to the other burners. The electrode 20 and the tube 21 are connected to a separate source of electric power 14 and a voltage is impressed between them across the annular space 22. An ionizing additive is supplied to the annular space 22 and is heated by an electrical discharge between the electrode 20 and the tube 21 to raise it to a temperature such as to provide the required degree of ionization. Alternatively, either the electrode 20 or the tube 21 may be coated with a metallic salt, they may be impregnated with such a salt, or the electrode 20 may have a metallic salt core. The heat of the electrical discharge between these two members will vaporize the salt and, thus, supply it to the piloting zone.

In another form of burner, the inner electrode may be solid and made of a material having a low ionization potential (aluminum, for example) which is heated and burned down slowly during operation of the flame. The metal vaporized from the solid electrode supplies the ionizing additive.

Figure 7:
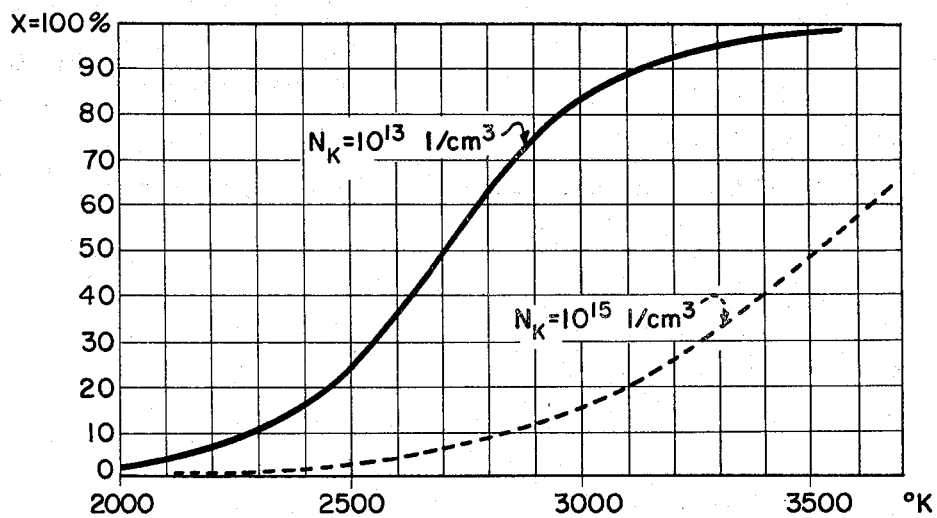
FIGURE 7 is a graph in which the percentage of ionized potassium atoms is plotted against temperature in degrees K.

In the burners described, the amount of ionization desired in the flame can be produced at will and closely controlled simply by controlling the temperature of the piloting zone. The significance of the effect of the temperature of the piloting zone is shown in FIGURE 7, which is a graph in which the percentage ionization (X) of the ionizing additive is plotted against temperature in degrees K. In this figure the solid line represents the percentage ionization against temperature when the concentration of potassium atoms ($N_k$) is $10^{13}$/cm.³ and the chain line represents the percentage ionization when the concentration of potassium atoms ($N_k$) is $10^{15}$/cm.³. Reference to FIGURE 7 shows that if the concentration of the potassium atoms is increased by $10^2$ when the electron concentration increases by $10^1$, but the approach to complete ionization is shifted to higher temperatures.

On the other hand, FIGURE 7 also shows that above approximately 2700° K. the slope of the curve (i.e., the increase of ionization with temperature) decreases, and, therefore, the tendency of the electrical discharge to form an arc decreases, and also that the degree of ionization approaches unity. In other words, raising the temperature of the piloting zone decreases the rate in increase of ionization with temperature and increases the amount of ionization. Thereby control of the ionization to prevent arcing is obtained and at the same time the amount of ionization for a distributed discharge is obtained.

The control of the amount of ionization in turn controls the electrical conductivity of the flame and thereby the temperature and operation of the flame may be controlled. The significance of the ready and simple control of the electrical conductivity of a flame also can be demonstrated mathematically with reference to conditions necessary for the initial application of an electrical discharge to a flame created by chemical combustion.

An essential feature of the electrically augmented flame described and claimed in my Patent No. 3,004,137 is that the discharge is dispersed throughout the whole flame volume. Dispersion is accomplished because of the turbulent motion and electrical conductivity of the flame gases. Dispersion of the electrical discharge through the flame requires that the dimensionless quantity $$D=\left(\frac{dN_e}{dT}\right)\left(\frac{l}{u'}\right)\left(\frac{0.24\epsilon k_e}{c_p \rho}\right)E^2$$

shall be smaller than a critical value, which is in the order of one.

Here:

$N_e$=concentration of free electrons, 1/cm.³
$T$=gas temperature, ° K.
$l$=scale of turbulence, cm.
$u'$=intensity of turbulence, cm./sec.
$\epsilon$=elementary charge $1.59 \cdot 10^{-19}$, coulomb $k_e$=electron mobility, $\dfrac{\text{cm./sec}}{\text{volt/cm.}}$ $c_p$=specific heat of the flame gas, cal./g.° K.
$\rho$=density of the flame gas, g./cm.³
$E$=impressed voltage gradient, volt/cm.

In the electrically augmented flame, the voltage gradient applied to the flame is relatively high, but if too high a voltage is applied to a flame, the discharge will break down into an arc. It is obviously desirable to maintain the voltage gradient as closely as possible to, but below, the critical voltage gradient at which an arc forms. From the above equation, it is clear that dispersion can be accomplished by maintaining the voltage gradient below the critical value. At the initial application of electric power to a flame, however, there should be sufficient electrical conductivity in the flame so that at a voltage gradient below the critical value there can be a substantial power input. The required electrical conductivity of the flame is controlled by the following criterion:

$$\frac{\Delta T}{N_e}\left(\frac{dN_e}{dT}\right)\frac{l}{u'}\frac{U}{L}<1$$

Here:
$\Delta T$=the increase in flame temperature due to electric power input, °K.
$N_e$=electron concentration without discharge, 1/cm.³
$U$=burned gas flow velocity, cm./sec.
$L$=flame length, cm.

The starting characteristics of a flame may therefore be controlled by ion electron concentration prior to the application of an electrical discharge and by the change in that concentration with temperature. It can also be controlled by varying the gas flow velocity, the flame length, or the temperature, but such variation may create difficulties in the design of burners for particular applications. However, the ion electron concentration and the change of this concentration with temperature can readily be varied using my method and apparatus.

The application of the second formula to an assumed burner operation will demonstrate the value of my method and apparatus in starting up an electrically augmented flame. In this application, the following operating conditions are assumed:

Flame length, $L=5$ cm.
Flow velocity, $u=10^4$ cm./sec.
Characteristic time of turbulence, $l/u'=10^{-4}$ sec.
Flame temperature, $T=2000°$ K.
Potassium atoms present in the flame, $10^{13}$ atoms/cm.³

Then $$N_e=0.18\times 10^{12}\ 1/cm.^3$$

$$\frac{dN_e}{dT}=0.158\times 10^{10}\ 1/cm.^3/K.°$$

and if the desired increase in temperature ($\Delta T$) is 1000° K., then $$\frac{\Delta T}{N_e}\left(\frac{dN_e}{dT}\right)\frac{l}{u'}\frac{U}{L}=1.75>1$$

The criterion is thus not fulfilled and the given configuration is not suitable for the application of electric power to the flame.

As stated above, the conditions could be changed by varying such parameters as flame length, flow velocity, and temperature, but such changes may render the flame unsuitable for the particular application for which it is intended, whereas, by varying the ionization in the flame in accordance with my invention, the flame may be readily started and the other design requirements met.

Thus, assume a flame with the same parameters as above but, in addition, supply ions and electrons from a hot piloting zone in excess of thermal equilibrium ion electron concentration. If the ion electron concentration reaches a value of $10^{13}$ 1/cm.³,
Then $$N_e=10^{13}\ 1/cm.^3$$

$$\frac{dN_e}{dT}=10^{10}$$

and $$\frac{T}{N_e}\left(\frac{dN_e}{dT}\right)\frac{l}{u'}\frac{U}{L}=0.2<1$$

The criterion is satisfied and the flame will have sufficient electrical conductivity for the initiation of a distributed electrical discharge through the flame. The other parameters which may be desired for a particular application such as flame length, flow velocity and temperature are unchanged in the above example.

As stated above, in the operation of an electrically augmented flame, it is desirable that the electron concentration be maintained at a high level and that the change in this concentration with temperature be maintained as low as possible. An important feature of this invention, therefore, is that I can obtain high electron concentration by method and apparatus which are independent of the characteristics of the flame formed by chemical combustion. In fact, this invention may be used in situations where the contribution of heat by the flame is insignificant or nonexistent and where it is required that a stream of gases be heated by a distributed electrical discharge alone. In accordance with the invention the distributed electrical discharge is maintained in a turbulent gas stream and the stream is heated by this electrical discharge. This obtains important advantages over heating the stream with an electric arc. For the same input of electrical power, my invention makes possible the use of high voltages and low currents as contrasted to an arc and problems in the construction and maintenance of electrodes are minimized. It also provides more uniform distribution of the heat originating from the electrical power input through the gas stream. Also, it is possible to heat gas streams which have such chemical compositions that, in order to obtain a desired end product, they cannot be mixed with products of combustion.

Figure 8:
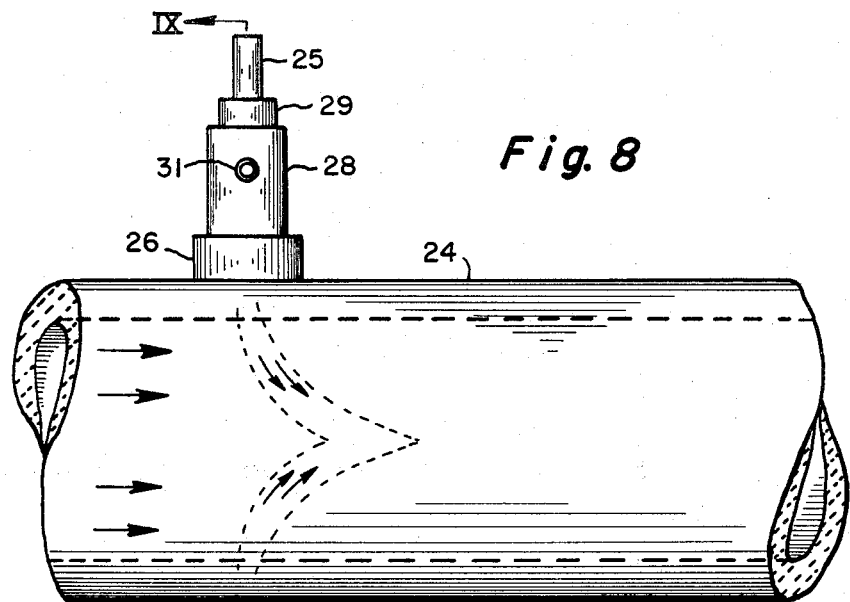
FIGURE 8 is a partial longitudinal section of a burner in which a gaseous stream is heated without chemical combustion.
Figure 9:
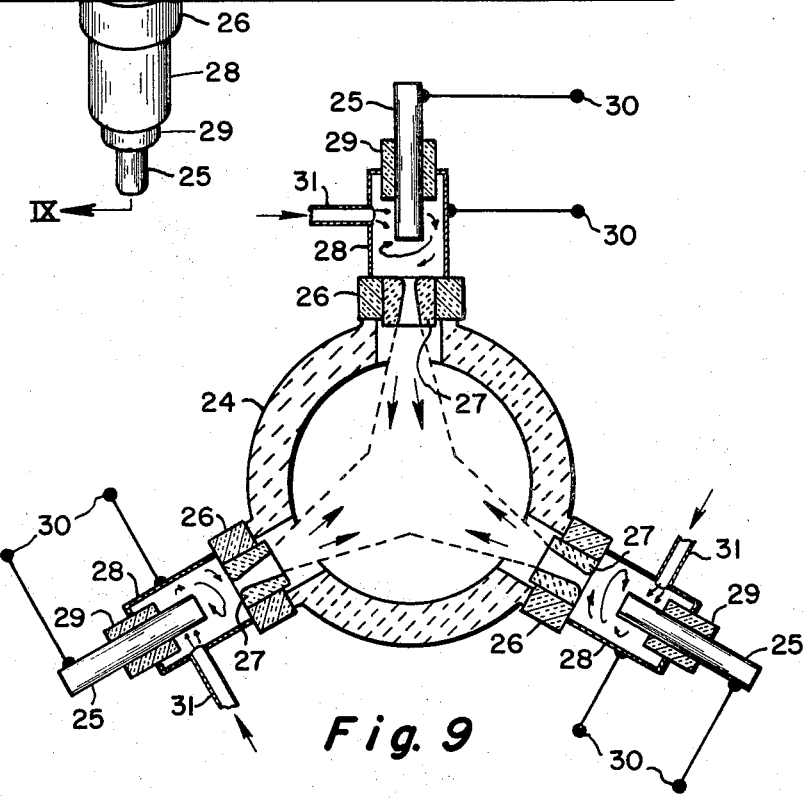
FIGURE 9 is a section along the lines IX—IX of FIGURE 8.

FIGURES 8 and 9 show a burner in which gaseous streams are heated without a flame produced by chemical combustion. The burner comprises a tube 24 through which the gaseous stream to be heated is passed as indicated by arrows in FIGURE 8. Equally spaced around the tube are three electrodes 25 which are connected to a threephase alternating current supply (not shown) and which supply the electrical energy for creating a distributed electrical discharge in the gaseous stream to be heated.

The electrodes 25 are electrically insulated from the tube by insulators 26 which also support jet nozzles 27 from which gas jets emerge towards the axial center of the tube. The electrodes are surrounded by metal casings 28 insulated from the electrodes by insulators 29. A voltage sufficient to maintain arcs between the electrodes 25 and the casings 28 is supplied by an electrical power source 30 which may be in the order of a few hundred volts. Alternately there can be two or more electrodes within each case and electrical discharges maintained between them.

The casings 28 also have inlets 31 for the admission of high pressure gas into the casings. This gas has a swirling motion within the casings, and being cold, impinges against their inner walls and thereby insulates the casing walls from the heat of the arcs between the electrodes and the casings.

Ionizing additives are fed into the high pressure gas streams at the inlets 31. For example, potassium chloride can be vaporized (by apparatus not shown) and fed to the inlets 31.

The mass flow rate of the high pressure gas entering the casings 28 amounts to only a few per cent of the gaseous stream to be heated and flowing through the tubes 24, but is sufficient to cool the casings 28 and create gas jets emerging from the nozzles 27 with sufficient velocity to create a high degree of turbulence within the main stream flowing thorugh the tubes 24. The turbulence must be of such degree as to insure the existence of a distributed discharge along the turbulent jets.

The arcs between the electrodes 25 and casings 28 are of such intensity that the high pressure gas streams carrying ionizing additives are heated within the casings to the temperature required to produce sufficient ionization to the jets to maintain a distributed electrical discharge within the main gas stream in the tube 24. The jets emerging from the nozzles 27 impinge on each other and close the electrical circuit from one jet to the other.

The three-phase electrical supply connected to the electrode 25 supplies the electrical power for this discharge. The voltage in this power supply may be in the order of several thousand volts, but the current will be relatively low and, therefore, a large amount of electrical energy can be supplied to the main gas stream without the electrode problems normally associated with such energy values. There is uniform distribution of heat through the main stream and gas streams can be heated for reactions in which the normal products of combustion cannot be accepted.

Electrically augmented high temperature, high velocity turbulent jets are particularly well suited for process applications. Such jets generate high intensity turbulence of short characteristic time, as required for the dispersion of a powerful electrical discharge, even in locations where they are far removed from the walls of the containing furnace or reactor. They can entrain large and well-controlled amounts of secondary gas, or dust-laden gas, from their surroundings as required by the particular chemical reaction.

The high pressure gas stream which feeds the high velocity jet may be heated by electrical power only, like the one described above, or it may be heated by the chemical heat release of a flame burning in the high pressure chamber, or by an electrically augmented flame.

While I have described certain presently preferred embodiments of my invention, it is to be understood that my invention may be otherwise embodied within the scope of the appended claims.

I claim:

1. In the production of an electrical discharge distributed substantially uniformly through a gaseous stream the steps comprising,
    (A) maintaining a high temperature gaseous piloting zone,
    (B) introducing ionizing additives into said piloting zone, and
    (C) introducing into said gaseous stream ionized gases from the high temperature piloting zone.

2. The production of an electrical discharge as described in claim 1 in which ionizing additives are introduced to said zone in an amount to bring the concentration of atoms of said additives to a minimum value of $10^{13}$ cubic centimeter.

3. The production of an electrical discharge as described in claim 1 in which the temperature maintained in said zone is regulated to produce the desired degree of ionization.

4. The production of an electrical discharge as described in claim 1 in which the amount of ionizing additive introduced into said high temperature gaseous zone is regulated to produce the desired degree of ionization.

5. In the production of an electrical discharge distributed uniformly through a flame the steps comprising,
    (A) maintaining a piloting zone at the root of the flame at a temperature substantially higher than the balance of the flame, and
    (B) introducing into said piloting zone ionizing additives.

6. The production of an electrical discharge as described in claim 5 in which said piloting zone at the root of the flame is heated by a pilot flame having a supply of combustible mixture separate from the supply for said flame, in which an electrical discharge is maintained through said pilot flame and in which said ionization additives are introduced into the pilot flame through said separate supply.

7. The production of an electrical discharge as described in claim 5 in which said piloting zone is heated by an electrical discharge between electrodes positioned in said zone and in which said ionization additives are vaporized from said electrodes.

8. In the production of an electrical discharge distributed substantially uniformly through a gaseous stream the steps comprising,
    (A) maintaining a flow of said gaseous stream,
    (B) creating at least one gaseous jet,
    (C) heating said gaseous jet,
    (D) introducing ionizing additives into said jet,
    (E) projecting said heated and additive containing jet into said stream, and
    (F) maintaining a distributed electrical discharge along said jet and through said stream.

9. The improvement in apparatus for producing a stream of high temperature gas which apparatus includes a burner tube for creating a flame by chemical combustion in a gas stream and means for establishing a substantial electrical discharge distributed across the flame, the improvement comprising,
    (A) means for creating at the root of the flame a zone having a temperature higher than the temperature of the flame, and
    (B) means for introducing into said zone ionization additives.

10. Apparatus for producing a stream of high temperature gas which apparatus includes a burner tube for creating a flame by chemical combustion in a gas stream and means for establishing a substantial electrical discharge distributed across the flame, the improvement comprising,
    (A) an electrode centrally positioned in said burner tube and having an end spaced inwardly from the end of said burner tube,
    (B) a second tube within the burner tube
        (1) surrounding the electrode but spaced therefrom to form an annular passage for the flow of a combustible mixture,
        (2) the end of said second tube extending beyond the electrode towards the end of the burner tube,
    (C) means for establishing an electrical discharge between said electrode and said second tube, and
    (D) means for supplying ionization additives to said annular passage.

11. Apparatus for producing a stream of high temperature gas, which apparatus includes a burner tube for creating a flame by chemical combustion in a gas stream and means for establishing a substantial electrical discharge distributed across the flame, the improvement comprising,
    (A) an electrode centrally positioned within said burner tube and having an end spaced inwardly from an end of said tube,
    (B) a second tube within the burner tube spaced from and surrounding said electrode,
    (C) means for creating an electrical discharge between said electrode and said second tube, and
    (D) a metal salt having a low ionization potential carried by at least one of the two members between which said electrical discharge is created,
    (E) the electrical discharge vaporizing the metal salt to provide ionization for said flame.

12. Apparatus for producing an electrical discharge substantially distributed across a gaseous stream comprising,
    (A) a tube for the flow of said gas stream,
    (B) electrodes positioned adjacent and around said tube,
    (C) casings,
        (1) spaced from said electrodes,
        (2) electrically insulated from said electrodes and the casings, and
        (3) enclosing spaces around said electrodes,
    (D) means for creating arcs between the electrodes and the casings to heat gases within said spaces,
    (E) means for introducing gas under high pressure into said spaces, (F) means for introducing ionizing additives into said high pressure gas in advance of its introduction into said spaces, (G) jet nozzles leading from said spaces into said tube whereby said high pressure gas containing ionizing additives is introduced into said gas stream within said tube in the form of jets to create turbulence therein, and (H) means for supplying high energy, low current electrical energy between said electrodes and through said gas stream flowing through said tube.

References Cited
UNITED STATES PATENTS

| | | | |
|---|---|---|---|
| 2,304,412 | 12/1942 | Kern | 313—179 |
| 3,004,137 | 10/1961 | Karlovitz | 219—75 |
| 3,093,767 | 6/1963 | Lafferty | 313—180 X |
| 3,246,115 | 4/1966 | Johnson | 219—121 |
| 3,264,508 | 8/1966 | Lai | 313—231 |

JAMES W. LAWRENCE, *Primary Examiner.*

STANLEY D. SCHLOSSER, *Examiner.*

R. JUDD, *Assistant Examiner.*